United States Patent
Gratzer

(10) Patent No.: US 6,250,444 B1
(45) Date of Patent: Jun. 26, 2001

(54) HYDRAULIC CLUTCH WHICH IS DEPENDENT ON ROTATION SPEED DIFFERENCE AND HAS TORQUE LIMITING

(75) Inventor: Franz Gratzer, Stallhofen (AT)

(73) Assignee: Steyr-Daimler-Puch Fahrzeugtechnik AG & Co. KG.

(*) Notice: Subject to any disclaimer, the term of this patent is extended or adjusted under 35 U.S.C. 154(b) by 0 days.

(21) Appl. No.: 09/428,740

(22) Filed: Oct. 28, 1999

(30) Foreign Application Priority Data

Oct. 29, 1998 (AT) .................................................. 704/98 U

(51) Int. Cl.$^7$ .................................................. F16D 43/284
(52) U.S. Cl. ........................................ 192/35; 192/103 F
(58) Field of Search .................................. 192/35, 103 F, 192/56.31, 113.34, 113.35, 70.12

(56) References Cited

U.S. PATENT DOCUMENTS

| | | | |
|---|---|---|---|
| 3,612,237 | * 10/1971 | Honda | 192/85 AA |
| 4,049,101 | * 9/1977 | Hattori et al. | 192/103 F X |
| 4,181,203 | * 1/1980 | Malloy | 192/103 F X |
| 4,261,455 | * 4/1981 | Uitenbroek et al. | 192/106 F |
| 4,696,383 | * 9/1987 | Aoki et al. | 192/70.12 |
| 5,611,746 | 3/1997 | Shaffer. | |
| 6,098,771 | * 8/2000 | Vu | 192/70.12 |

FOREIGN PATENT DOCUMENTS

| | | |
|---|---|---|
| 4109789A1 | 10/1991 | (DE). |
| 0570841 | 11/1993 | (EP). |
| 0581014 | 2/1994 | (EP). |
| 0629790 | 12/1994 | (EP). |
| WO9641090 | 12/1996 | (WO). |

* cited by examiner

Primary Examiner—Rodney H Bonck
(74) Attorney, Agent, or Firm—Bachman & LaPointe, P.C.

(57) ABSTRACT

A hydraulic clutch which is dependent on rotation speed difference comprises a rotating housing (1), a hydrostatic displacement machine (2) arranged in this housing (1), a shaft (4), a friction clutch (3) for connecting the shaft (4) to the housing (1), and a piston (26). In order to limit the torque in a very simple manner without any disturbing centrifugal force influences, and in order to cool the friction clutch, the compression chamber (24) is connected via a constriction point (27) to the interior (28) of the friction clutch (3), and the constriction point is designed as a pressure-limiting valve. This is formed by a plate spring (30) in the wall (29) of the piston (26).

5 Claims, 3 Drawing Sheets

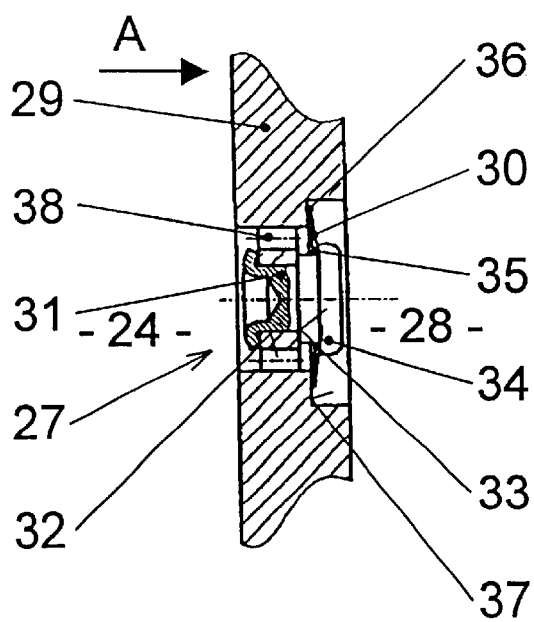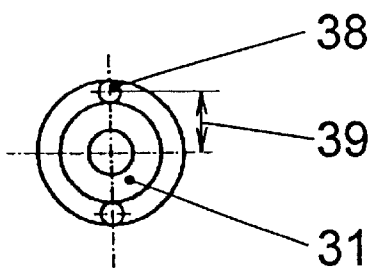
FIG 2　　　　　　　　　FIG 3
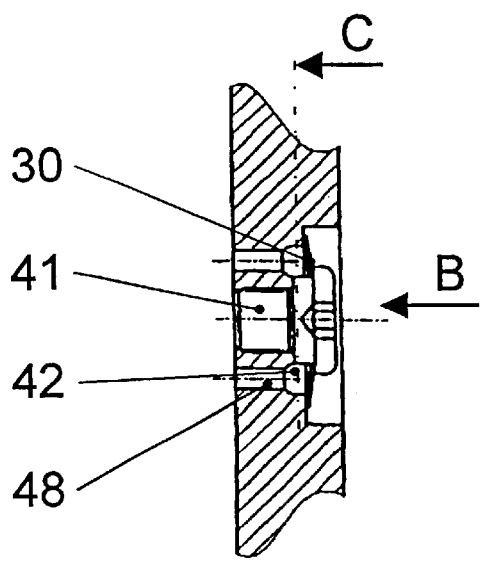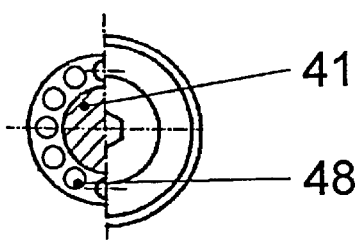
FIG 4　　　　　　　　　FIG 5

HYDRAULIC CLUTCH WHICH IS DEPENDENT ON ROTATION SPEED DIFFERENCE AND HAS TORQUE LIMITING

BACKGROUND OF THE INVENTION

The invention relates to a hydraulic clutch which is dependent on rotation speed difference and comprises a rotating housing, a hydrostatic displacement machine arranged in this housing, a shaft, a friction clutch for connecting the shaft to the housing, and a piston, in which case, when a difference in rotation speed occurs between the housing and the shaft, a pressure which acts on the piston is produced in a compression chamber. This pressure is applied to the friction surfaces of the friction clutch.

Such clutches are used in various arrangements in the drive run of motor vehicles, either to transmit torque directly or to block a connected differential transmission, for driving the wheels on one axle or for distributing the torque between two axles. In any case, the hydrostatic displacement machine comprises an inner rotor and an outer rotor, which move relative to one another if there is any rotation speed difference between the inner rotor and the outer rotor or, in particular, between the housing and the shaft and thus, in the compression chamber, exert on the piston the pressure which is required to act on the clutch.

An apparatus of this generic type is disclosed, for example, in WO 96/41090. There, the arrangement is designed such that a valve is fitted in the piston, and closes when a specific pressure is reached. Oil thus enters the clutch area only until the clutch is engaged. The oil is then simply centrifuged away in some manner through openings on the circumference of the rotating housing. When the clutch starts to engage, that is to say it produces a large amount of friction heat, the oil is still absent. The clutch plates thus become severely heated during driving, and are subject to high wear.

Since the weight of modern motor vehicle drive runs is designed to be optimized, it is necessary to limit the transmitted torque, and this can be achieved by limiting the pressure in the compression chamber. In the hydraulic clutch which is dependent on rotation speed difference according to DE 41 09 789 C2, this is achieved by means of an overpressure valve accommodated in the stationary housing. However, since the compression chamber is located in the rotating part, a rotating bushing is required to connect the valve and compression chamber. This makes the design complex, particularly if the clutch is intended to operate without any external control action. However, the overpressure valve must then be accommodated in the rotating parts.

As a rule, overpressure valves comprise a spring-loaded valve body. If this is fitted in a rotating part, then it is subject to the centrifugal force. Furthermore, such valves require a relatively large physical space, particularly if they are aligned with the rotation axis.

Although U.S. Pat. No. 5,611,746 relating to such items discloses a constriction valve in the rotating part, this can, however, only be set permanently and is thus not spring-loaded and, furthermore, is connected only indirectly to the compression chamber; and not to the clutch area at all. In addition, it could not be spring-loaded at all, since the centrifugal force would act against the spring if aligned radially, and would produce a friction brake if aligned axially. Nevertheless, this constriction valve is difficult to accommodate, see FIGS. 1 and 9 in this respect.

The object of the invention is thus to improve an apparatus of type discussed above such that the cooling of the friction clutch is improved, the space required is minimized, and it is possible to limit the torque in a very simple manner without any disturbing centrifugal force influences.

SUMMARY OF THE INVENTION

According to the invention, the foregoing is achieved in that the compression chamber is connected via a pressure-limiting valve to the interior of the friction clutch. The pressure-limiting valve is thus arranged in the rotating part of the apparatus and, if the overpressure valve is suitably designed, flow passes through the clutch area when the clutch is highly loaded and cooling is urgently required.

In one preferred embodiment, the pressure-limiting valve is formed by a plate spring which is arranged on the side of the interior, whose inner rim is clamped in and whose outer rim covers at least one hole. Design as a plate spring valve has three major advantages: insensitivity to centrifugal force influences, small space requirement and large flow cross section. The plate spring thus simultaneously acts as a spring and as a valve body which can cover a plurality of holes.

The small space requirement allows the pressure-limiting valve to be accommodated in the wall of the piston perpendicular to the axis. This embodiment is particularly advantageous if the piston is arranged between the friction clutch and the hydrostatic displacement machine. The short physical length of the plate spring valve even allows it to be accommodated in a very thin piston wall.

In one preferred embodiment of the valve, the wall of the piston has a central hole and flow holes which surround the central hole at the same distance. A bolt or a screw is seated in the central hole, which bolts or screws hold the plate spring, and the flow holes surrounding them offer a large flow cross section.

In a development of the invention, the pressure-limiting valve is designed as a constriction point. This ensures adequate cooling and lubrication of the friction clutch even when lightly loaded, and renders a specific constriction valve superfluous.

In one particularly simple design of the constriction point, the outer rim of the plate spring interacts with a contact surface which has a notch that acts as a constriction channel.

BRIEF DESCRIPTION OF THE DRAWINGS

The invention will be described and explained in the following text with reference to illustrations, in which:

FIG. 2 shows detail II in FIG. 1 in a first embodiment;

FIG. 3 shows view A in FIG. 2;

FIG. 4 shows detail II in FIG. 1 in a second embodiment;

FIG. 5 shows views B and C in FIG. 4;

DETAILED DESCRIPTION

Figure 1:
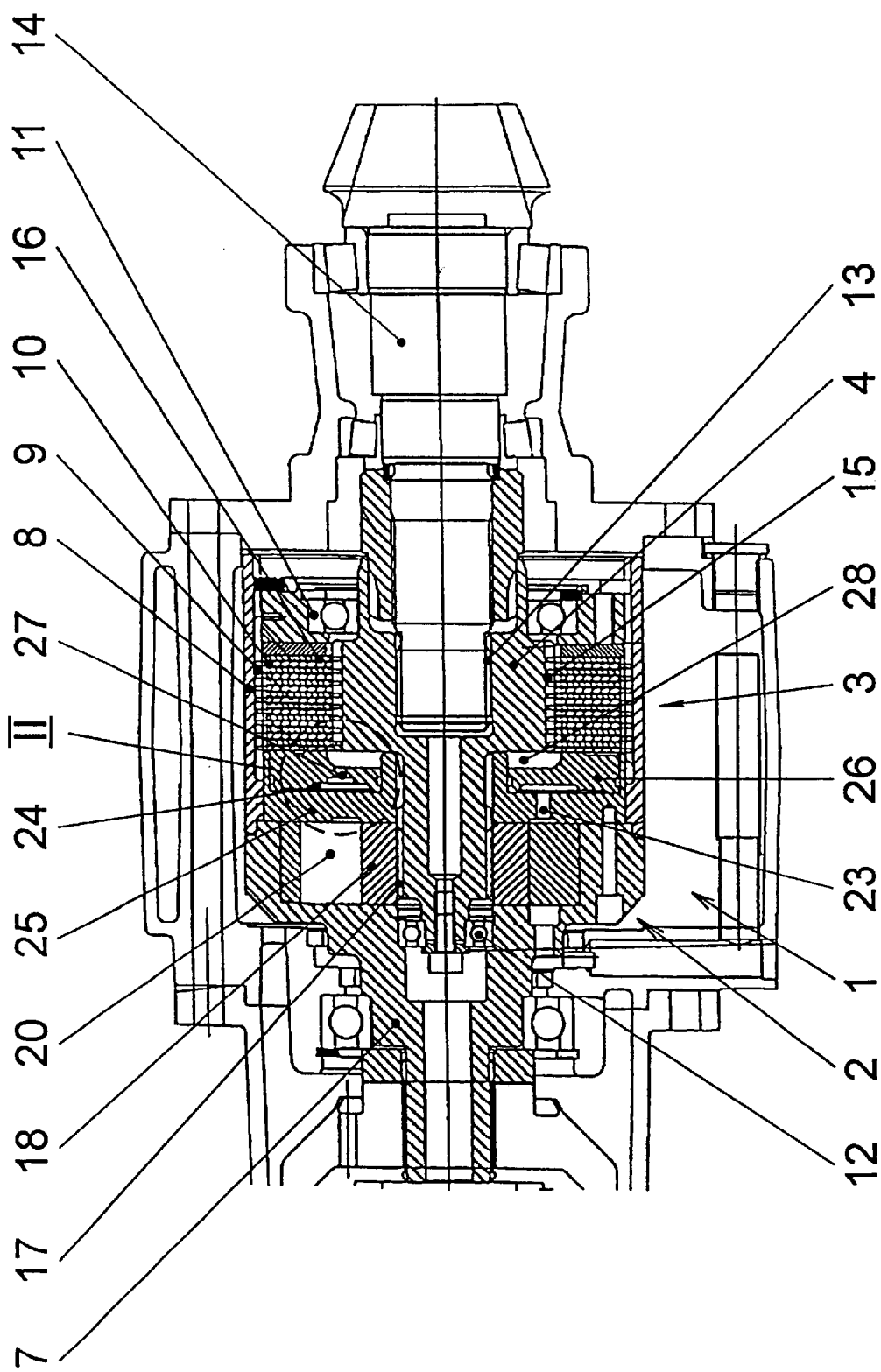
FIG. 1 shows an exemplary embodiment of a clutch according to the invention.

In FIG. 1, a stationary housing is only indicated and is not designated. This surrounds a rotating housing 1, which contains a hydrostatic displacement machine 2 and a friction clutch 3 which can produce the connection between the rotating housing 1 and a shaft 4.

The rotating housing 1 comprises a head part 7 and a casing part 8 with first clutch teeth 9 for the outer plates 10 of the friction clutch 3. In the illustrated exemplary embodiment, the input drive is connected to the head part 7, but this could also be the output drive. The shaft 4 is mounted in bearings 11, 12 with respect to the rotating housing 1, and is connected by means of a first toothed spline system 13 to an output drive shaft 14. Externally, the shaft 4 has two clutch teeth 15 for the inner plates 16 of the friction clutch 3. This is connected by means of a second toothed spline system 17 to an inner rotor 18 of the hydrostatic displacement machine 2. The inner rotor 18 interacts with an eccentric outer rotor. A working chamber 20 is formed between the two and produces a pressure when there is any relative rotation between the rotating housing 1 and the shaft 4.

A channel 23 leads from this working chamber 20 to a compression chamber 24, which is bounded on one side by a separating plate 25 and on the other side by a piston 26. The latter contains a constriction point 27 which, according to the invention, is designed as a pressure-limiting valve, allows a working medium to pass into an internal chamber 28 in the friction clutch, and is provided in a relatively thin wall of the piston 26, perpendicular to the axis.

FIGS. 2 and 3 show the design of the pressure-limiting valve. A plate spring 30 is provided on the side of the internal chamber 28 of the piston wall 29. A rivet 31 is firmly riveted in a central hole 32, for which purpose said rivet 31 has a shoulder 33. The head 34 of the rivet 31 holds the inner rim 35 of the plate spring 30 with a certain amount of prestressing. Its outer rim 36 is thus pressed against a recessed contact surface 37, by which means flow holes 38 are covered. In the illustrated exemplary embodiment, two flow holes 38 are provided at a distance 39 from the axis of the central hole 32. On reaching a specific pressure, the outer rim 36 of the plate spring 30 lifts off, and the valve starts to open.

In the version in FIGS. 4 and 5, identical parts have the same reference symbols. The difference is that a collar screw 41 is firmly screwed into the central hole 32 instead of the rivet 31 and that a large number of flow holes 48 are provided, which are connected by an annular chamber 42 on the face of the plate spring 30. This allows a very high liquid flow to be provided. The screw may also be secured in some other way rather than by the collar.

Figure 6:
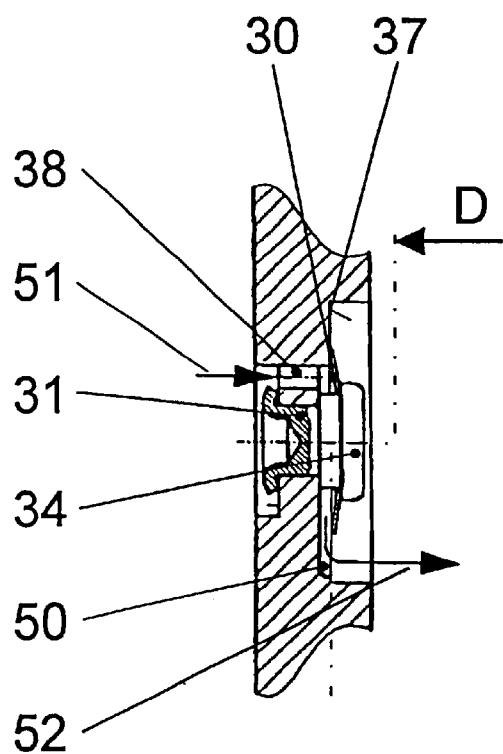
FIG. 6 shows detail II in FIG. 1 in a third embodiment.
Figure 7:
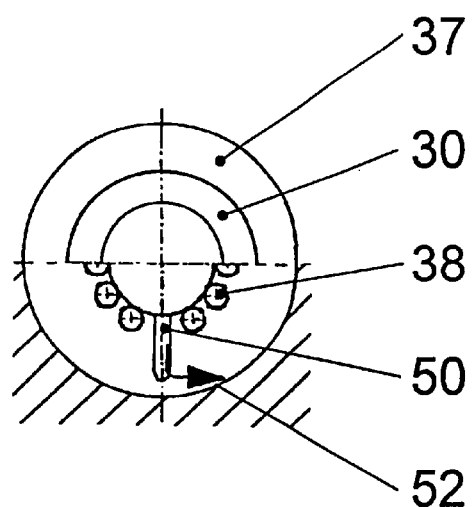
FIG. 7 shows view D in FIG. 6, with the spring partially removed.

In a further version, in FIGS. 6 and 7, the pressure-limiting valve is designed such that it also acts as a constriction valve, which ensures a specific minimum flow. For this purpose, a notch 50 which acts as a constriction channel is provided in the contact surface 37, the profile of which notch 50 is such that it continues below the outer rim 36 of the plate spring 30. Here, it is aligned radially, but could also be a secant. The flow paths are denoted by 51 and 52.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hydraulic clutch which is dependent on rotation speed difference, comprising a rotating housing (1), a hydrostatic displacement machine (2) arranged in this housing (1), a shaft (4), a friction clutch (3) for connecting the shaft (4) to the housing (1), and a piston (26), in which case, when a difference in rotation speed occurs between the housing (1) and the shaft (4), a pressure which acts on the piston is produced in a compression chamber (24), wherein the compression chamber (24) is connected via a pressure-limiting valve (27) to the interior (28) of the friction clutch (3), wherein the pressure-limiting valve (27) is formed by a plate spring (30) which is arranged on the side of the interior (28), whose inner rim (35) is clamped in and whose outer rim (36) covers at least one flow hole (38).

2. The hydraulic clutch which is dependent on rotation speed difference as claimed in claim 1, wherein the pressure-limiting valve is accommodated in the wall (29) of the piston (26) perpendicular to the axis.

3. The hydraulic clutch which is dependent on rotation speed difference as claimed in claim 2, wherein the wall (29) of the piston has a central hole (32) and flow holes (38) which surround the central hole (32) at the same distance (39).

4. The hydraulic clutch which is dependent on rotation speed difference as claimed in claim 1, wherein the pressure-limiting valve (27) is designed as a constriction point.

5. The hydraulic clutch which is dependent on rotation speed difference as claimed in claim 4, wherein the outer rim (36) of the plate spring (30) interacts with a contact surface (37) which has a notch (50) that acts as a constriction channel.

* * * * *